US011588327B2

(12) United States Patent
Rixhon et al.

(10) Patent No.: US 11,588,327 B2
(45) Date of Patent: Feb. 21, 2023

(54) SAFE AND RESILIENT ENERGY DISTRIBUTION FOR A HIGHLY EFFICIENT MICROGRID

(71) Applicant: CE+T POWER LUXEMBOURG SA, Troisvierges (LU)

(72) Inventors: Daniel Rixhon, Saint-Georges-Sur-Meuse (BE); Stephane Fagny, Heinsch (BE); Francois Finfe, La Louviere (BE); Benoit Bidaine, Saive (BE); Paul Bleus, Liege (BE)

(73) Assignee: CE+T POWER LUXEMBOURG SA, Troisvierges (LU)

( * ) Notice: Subject to any disclaimer, the term of this patent is extended or adjusted under 35 U.S.C. 154(b) by 533 days.

(21) Appl. No.: 16/813,793

(22) Filed: Mar. 10, 2020

(65) Prior Publication Data

US 2021/0288492 A1 Sep. 16, 2021

(51) Int. Cl.
*H02J 3/01* (2006.01)
*G05B 19/042* (2006.01)
(Continued)

(52) U.S. Cl.
CPC ............ *H02J 3/001* (2020.01); *G05B 19/042* (2013.01); *H02J 3/36* (2013.01); *H02J 3/381* (2013.01);
(Continued)

(58) Field of Classification Search
CPC .... H02J 3/001; H02J 3/36; H02J 3/381; H02J 2300/20; H02J 13/00024; H02J 2310/16;
(Continued)

(56) References Cited

U.S. PATENT DOCUMENTS 8,044,535 B2   10/2011  Bleus
9,917,436 B2 *  3/2018  Popescu ................. H02H 7/263
(Continued)

FOREIGN PATENT DOCUMENTS

CN    208986604 U    6/2019
EP    1480434 A1    11/2004
(Continued)

*Primary Examiner* — Michael J Brown
(74) *Attorney, Agent, or Firm* — Leydig, Voit & Mayer, Ltd.

(57) ABSTRACT

A microgrid with a high voltage direct current (HVDC) source for efficiently and safely distributing power to decentralized loads includes: at least a main HVDC power supply connectable in input to an AC grid and in output to a main DC distribution network and loads system in output, the main HVDC power supply having energy reserve means and a main switch-based fault isolator or main FI, the main DC distribution network and loads system including: a maintrunk bus, and subtrunks buses and/or front end local loads cells connected in parallel to the maintrunk bus, and at each branching of a subtrunk bus and a load or of a subtrunk bus of rank n–1 and a subtrunk bus of rank n, a local switch-based fault isolator or local FI, n being an integer comprised in the range [1, N]. A smart main controller including microcontrollers for smart operation is also included.

19 Claims, 10 Drawing Sheets

(51) Int. Cl.
  *H02J 3/00* (2006.01)
  *H02J 3/38* (2006.01)
  *H02J 3/36* (2006.01)
  *G05B 19/04* (2006.01)

(52) U.S. Cl.
  CPC . *G05B 2219/25257* (2013.01); *H02J 2300/20* (2020.01)

(58) Field of Classification Search
  CPC ........ G05B 19/042; G05B 2219/25257; G05B 19/0428; Y02E 60/60
  USPC ..................................................... 700/292
  See application file for complete search history.

(56) References Cited

U.S. PATENT DOCUMENTS

| | | | |
|---|---|---|---|
| 2011/0279939 A1* | 11/2011 | Kitchener | ............... G06F 1/30 361/87 |
| 2013/0015703 A1* | 1/2013 | Rouse | ..................... H02J 3/06 307/18 |
| 2016/0036220 A1 | 2/2016 | Lacaux et al. | |
| 2016/0300643 A1 | 10/2016 | Aguiar et al. | |

FOREIGN PATENT DOCUMENTS

| | | | |
|---|---|---|---|
| EP | 3293851 A1 | 3/2018 | |
| WO | 2018210917 A1 | 11/2018 | |

\* cited by examiner

|   | 1 | 0 |
|---|---|---|
| 1 | 2 L | 1 L / 1 ST |
| 0 | 1 ST / 1 L | 2 ST |

FIG. 5

SAFE AND RESILIENT ENERGY DISTRIBUTION FOR A HIGHLY EFFICIENT MICROGRID

FIELD

The present invention relates to a system and a method developed for implementing efficient, resilient and safe distribution of electrical energy in High Voltage Direct Current (HVDC) and therefore suitable to contribute to the deployment of the fifth generation wireless technology for digital cellular networks (in short "5G" technology). High voltage AC distribution can also be contemplated in the frame of the present invention.

BACKGROUND

However the invention is also targeting any power distribution system in telecom field in general, IT field or power energy distribution in a microgrid with renewable sources and multiple loads set at different locations.

In the frame of the present application, the property of resilience will qualify power grids or networks infrastructure and operations characteristics such as strength and ability to make a fast recovery, which helps the grid or network to minimize or altogether avoid disruptions during and after a fault event.

Modern telecom operators see a dramatic increase of their energy consumption and the introduction of 5G technology is still expected to strengthen this tendency.

At the time our societies develop greater concern for environment and energy saving, increased demand for grid connectivity oppositely boosts energy consumption. Concurrently, the power consumption also tends to be offset toward the edge of the network where active equipment is decentralized.

In this context, power grids face multiple problems that all impact their reliability, quality and resilience. Consequently, telecom infrastructures cannot be deployed without equipment specifically aimed to provide quality power and backup. Having power resources in remote locations poses multiple challenges for operation and maintenance. Remote locations are expected to face harsh environments, to be hard place to get and, in metropolitan areas, to be submitted to various restrictions for installation.

Telecom operators get premium reward when first offering new services. Revenue generation is impacted for a long time. Quick deployment at low CAPEX is a key to catch the early mover revenue. Therefore, scalable solutions, pay-as-you-grow and expandability can play a major role to optimize the capital investment. While operating in traditional ways, power gets stranded because it is common to over-provision power resources and equipment. The capacity of reclaiming stranded power enables an organization to better use the initial capital investment and postpone the construction of ramifications.

Nowadays telecom networks additionally intend to become software-centric. The transformation is already underway implementing virtual functions to run on commodity hardware. Moreover, future power backup systems must be smart enough to cope with the actual workload constantly changing and moving within the infrastructure. Making software-defined communication infrastructures brings flexibility and effectiveness in network operation. It makes perfect sense to apply a same logic to power equipment and bring agility to power generation and storage. By pooling the points of generation and the storage capacities under the control of a management software it becomes possible to optimize the power infrastructures in regard to their location, time of use and efficiency.

Microgrid demonstrations and deployments have shown their ability to provide higher reliability and higher power quality than utility power systems as well as improved energy utilization. Smart grids also enable a more efficient use of electricity, shaving losses incurred during delivery and encouraging more efficient energy behavior by customers.

Combining microgrid infrastructures with the latest developments in energy conversion should allow to face sustainability challenges of next generation telecom networks along with the power availability and the infrastructure flexibility that are required to run reliable and profitable business.

In particular wireless 5G technology for telecommunication services is the new standard to guarantee broadband (up to 10 Gbps) and low latency (less than 5 ms). It will require to increase frequencies (e.g. from 26 GHz to 300 GHz), using millimeter waves. They offer much higher flowrate than present lower frequency waves (e.g. 4G, etc.), but their range is shorter and their penetration rate is quite poor. A wall or a rain downpour is enough to slow them down. In order to obtain good network coverage, it will therefore be necessary to multiply antennas (small cells) to circumvent obstacles, the latter being located for example on the roof of buildings or on lighting poles. Moreover, the antennas will be directional, that is to say capable of focusing directly on a mobile phone in order to send, for example, a video, so as to be more efficient and less energy consuming. These antennas will also be able to manage a large number of connections at the same time, without saturation.

However deploying radio transmitters at the edge of telecom networks and distributing power at high DC voltage will also induce some safety challenges. Usual mid-point grounding and fault detection by leakage measurement provide solutions that impede proper operability of the deployed systems: too many interruptions of service, no way to rapidly locate the fault, high MTTR, etc.

The applicant of the present application designs, manufactures and markets a range of products for industrial operators with mission critical applications, who are not satisfied with existing AC backup systems performances and related maintenance costs.

In particular, the applicant already markets the so-called ECITM module (for Enhanced Conversion Innovation) that is an energy router that offers an innovative AC backup solution that is unlike other UPS's (patent family of U.S. Pat. No. 8,044,535, B2)

To better allocate power resources and dispatch the power from wherever it is available to wherever it is most needed, the applicant has developed this energy router providing facility managers and microgrid design engineers with a tool for directing the power under the control of dedicated software means as power generation and demand vary.

Additionally, the applicant already markets the so-called "Power Fusion" concept that proposes a similar infrastructure based upon microgrid topology to power up datacenters and reduce dramatically the stranded power (patent family of WO 2018/210917 A1).

Document US 2011/0279939 A1 discloses an electrical circuit comprising a power supply, a load, first and second trunks disposed there between and control means adapted to control the electrical status of the first and second trunks, in which the control means comprises monitoring means adapted to monitor the current and/or voltage of the first and second trunks and to detect current and/or voltage events which are indicative of faults occurring thereon, and isolation means adapted to isolate the first or second trunk when the monitoring means detects a current and/or voltage event which is indicative of a fault occurring thereon, in which the first and second trunks are electrically connected and arranged in parallel such that the power supplied to the load is distributed substantially equally between them, and in which the control means comprises compensation means adapted to prevent the isolation means from isolating one of said first or second trunks when a current and/or voltage event which is indicative of a fault occurs thereon which is caused by a fault occurring on the other of the first or second trunks.

SUMMARY

In an embodiment, the present invention provides a microgrid with a high voltage direct current (HVDC) source for efficiently and safely distributing power to decentralized loads, comprising: at least a main HVDC power supply connectable in input to an AC grid and in output to a main DC distribution network and loads system in output, the main HVDC power supply comprising energy reserve means and a main switch-based fault isolator or main FI, the main DC distribution network and loads system comprising: a maintrunk bus, and subtrunks buses and/or front end local loads cells connected in parallel to the maintrunk bus, and at each branching of a subtrunk bus and a load or of a subtrunk bus of rank n−1 and a subtrunk bus of rank n, a local switch-based fault isolator or local FI, n being an integer comprised in the range [1, N]; and a smart main controller comprising microcontrollers configured to smartly operate in cascade neighboring local FIs in case of fault occurrence in the microgrid so as to segregate the fault and favor or increase a resilience of the microgrid, wherein smart operation in cascade of the neighboring local FIs comprises assignation of increasing switch opening times to local FIs in the main DC distribution network and loads system, the opening times at respective local FIs having a common time origin set as a fault occurrence time and increasing with increasing electrical or cable length distance of the local FIs, departing from a faulty subtrunk bus location in a direction towards main FI location so as to successively disconnect in a direction towards a main FI location the faulty subtrunk bus or buses from the network until arriving at a first non-faulty subtrunk bus, while at least one possible faulty local load has already been isolated within a timing corresponding to a local FI opening time of a last disconnected faulty subtrunk bus.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

Figure 5:
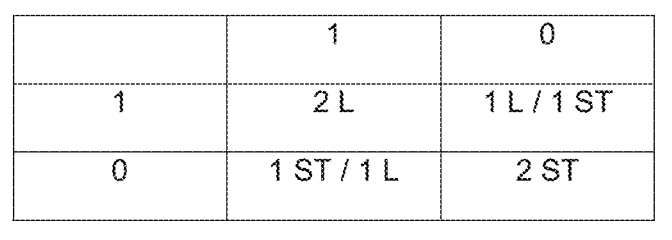

FIG. 5 is an example of switching table for the addressed double switches according to the present invention. Each relay is settable to switch a local load L (1) or a subtrunk ST (0).

DETAILED DESCRIPTION

Figure 1:
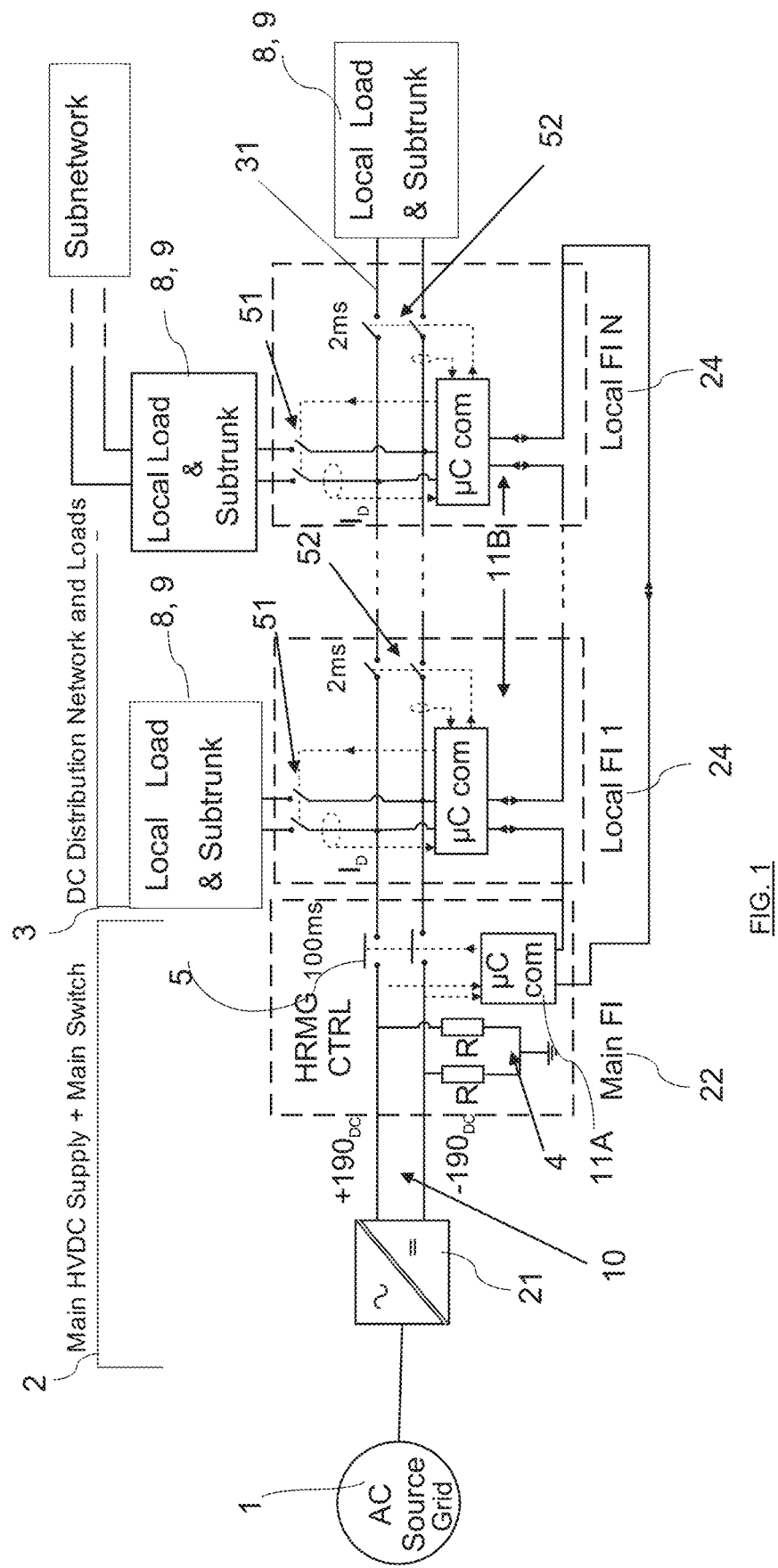
FIG. 1 is a schematic circuit diagram of a DC distribution microgrid power supply according to a first embodiment of the invention.

In an embodiment, the present invention avoids or reduces the drawbacks of prior art.

In an embodiment, the present invention responds to the multiple and contradictory challenges that the industry will be facing in managing and distributing power with cable lengths of several hundred meters, including safety concerns, while setting up any DC power distribution system like a microgrid, and particularly in 5G deployments.

In an embodiment, the present invention responds to the above challenges with a solution that is partly based on the innovative technologies recently patented by the applicant (ECI— U.S. Pat. No. 8,044,535, Power Fusion—WO 2018/210917, Remote Power Feeding—EP 1 480 434, etc.).

In an embodiment, the present invention provides a microgrid for distributing power to a number of decentralized loads and/or subtrunks in which local power supplies are available and resilient.

The present invention generally addresses a smart controlled load disconnecting system in a microgrid which can be under the form of numerous possible topologies such as a linear, tree, looped, . . . topologies or combinations thereof with one or multiple sources (e.g. HVDC or HVAC). These topologies are made of fault-event disconnectable individual sections, generally called "subtrunks buses", by use of (local) switch-based fault isolators. The particularity of the invention is that the controlling system is capable to successively disconnect in cascade neighbouring subtrunk sections, departing from a specific fault occurrence location, away from the fault in the line direction towards the main sources, with increasing opening times of the switches associated with respective local fault isolators located further and further away from the fault location. This successive disconnection in time of the switches along the electrical cables has the result that, at one instant, a first subtrunk bus not faulty (or not influenced by the fault) in the sequence, as well as the following subtrunk buses, are not disconnected anymore from the network. The advantage of this system is to prevent the whole network or a large part of it from going down and to limit the numbers of subtrunks or sections to be disconnected to strictly what is needed to let the microgrid function, should it be in some degraded mode, so rendering the microgrid the most safe, efficient and robust possible.

More specifically, the invention relates to a microgrid with a high voltage direct current (HVDC) source for efficiently and safely distributing power to decentralized loads, comprising:

at least a main HVDC power supply connectable in input to an AC grid and in output to a main DC distribution network and loads system, having energy reserve means, and comprising a main fault isolator or main FI;

the main DC distribution network and loads system comprising a maintrunk bus, and subtrunks buses and/or front end local loads cells connected in parallel to the maintrunk bus, and comprising, at each branching of a subtrunk and a load or of a subtrunk of rank n−1 and a subtrunk of rank n, a local switch-based fault isolator or local FI, n being an integer comprised in the range [1, N];

a smart main controller comprising microcontrollers, capable to smartly operate in cascade neighbouring local FIs in case of fault occurrence in the microgrid, so as to segregate the fault and favour or increase the resilience of the microgrid, characterized in that said smart operation in cascade of the neighbouring local FIs comprises assignation of increasing switch opening times to local FIs in the main DC distribution network and loads system, said opening times at respective local FIs having a common time origin set as the fault occurrence time and increasing with increasing electrical or cable length distance of said local FIs departing from a faulty subtrunk bus location in the direction towards main FI location, so as to successively disconnect in the direction towards main FI location the faulty subtrunk bus or buses from the network until arriving at a first non-faulty subtrunk bus, while at least one possible faulty local load has already been isolated within the timing corresponding to the local FI opening time of the last disconnected faulty subtrunk bus.

According to specific embodiments, the microgrid additionally comprises in combination one or of the following characteristics:

said smart main controller is also capable to identify the occurrence of a safety fault, of the type current leakage to earth, and a local power demand peak in local loads in at least one part of the distribution network and loads system and further to locally isolate said fault, as well as commanding the main central power supply to share at least part of its energy reserve with said local loads in at least one part of the distribution network and loads system, through the maintrunk bus and subtrunk buses, while keeping the voltage stable in the whole distribution network and loads system;

the maintrunk bus is composed of subtrunk buses in line and separated by local FIs. Consequently, the term "subtrunk bus" designates not only bus sections branched in parallel on the maintrunk bus but also all the sections constituting the maintrunk bus. All these subtrunk bus sections have the particularity to be disconnectable from their neighbouring sections thanks to their respective local switch-based fault isolators;

the microgrid comprises local bidirectional DC/DC or DC/AC converters for converting HVDC voltage to a stable DC, respectively AC, voltage output suitable to power front end local loads;

the main HVDC power supply comprises a bidirectional AC/DC converter or a bidirectional UPS converter of the type AC/DC/DC provided with an energy storage or a fully bidirectional AC/AC/DC with energy storage such as ECI technology;

the power supply is grounded and provided with two terminals respectively delivering +V, respectively Vac ($\varphi=0°$), −V, respectively Vac ($\varphi=180°$), preferably +190V, −190V for a 380 Vdc supply;

the local converters deliver in output a DC or AC voltage required for local loads;

the main FI comprises a high resistance mid-point ground HRMG controller and a main switch having an opening time T1, preferably equal to or higher than 100 ms, in series with the maintrunk and commanded by a main microcontroller;

the HRMG controller has two large-value resistors R, having a common end connected to earth and the other end respectively connected to one of the two terminals of HVDC, respective HVAC, power supply, said common end being connected to a main earthing terminal;

the resistor R value is selected with a large value so as to get a safety current meeting a safety requirement, such as standard IEC/TR 60479-5:2007, the value of resistor R being preferably in the range 10 to 1000 k;

said local FI comprises a first FI switch located between the maintrunk and the subtrunk/local load, a second FI switch being located in series with the maintrunk, or located between a first subtrunk and a secondary subtrunk/local load, a second FI switch being located in series with the first subtrunk, and so forth;

the opening time T3 of all the first FI switches feeding local loads is less than 10 ms, preferably 2 ms, and the opening time T2 of all the second FI switches feeding subtrunks is such as T2>T3, T2 being preferably at least 10 ms, each pair of first and second FI switches being commanded by a local microcontroller, so as to meet the condition T1>(T2+nT1/N)>T3, where n, integer, is a switch address varying between 0 and N−1, with N being the total number of local FIs comprising a first FI switch and a second FI switch;

the DC distribution network and loads system has a linear topology with linearly distributed loads and one or two sources, in the latter case one source being at each end of the maintrunk bus, or is making a loop with at least one source, or is designed according to a tree structure with a single source or according to a tree with several sub-loops;

in the tree structure, the local and/or subtrunk FI double switch are identified by the smart main controller through unique digital addresses with a related local load flag and/or subtrunk flag;

in the linear topology with one source at each end of the maintrunk bus, the local and/or subtrunk FI double switches are identified by the smart main controller, based on digital addressing carried out from the first source up to the second source, so that the FIs are able to isolate a faulty subtrunk from both sides in the linear topology without undue deenergizing of one or more local loads;

in the loop topology with one source, the local and/or subtrunk FI double switches are identified by the smart main controller, based on digital addressing of all the FIs in the loop, so that the FIs are able to isolate a faulty subtrunk from both sides of arrival in the loop topology without undue deenergizing of one or more local loads;

the unique digital addressing per FI double switch comprises two 2-states presetted flags, corresponding to Load or No-Load and SubTrunk or No-SubTrunk, allowing the double switch smart controller to isolate the faulty load or the last faulty subtrunk or only the faulty subtrunk in case of loop topology or double source setup;

the local bidirectional DC/DC or DC/AC converters for converting HVDC to respective DC or AC voltage output suitable to power front end local loads are also provided with local energy buffers such as capacitive buffers, so as to allow local energy storage suitable for absorbing power consumption peaks and so as to increase bus voltage variation;

all the smart controllers of converters are capable of redirecting power from the local energy buffers, upstream in the microgrid, so as to relieve the DC or AC power grid;

the microgrid utilizes a power cable containing 2N power stranded wires, allowing to subdivide the distribution network and loads system into two subnetworks A, B, made each of A1, . . . , An, . . . , AN and B1, . . . , Bn, . . . , BN subtrunks respectively, each single local load being connected to one or both subtrunks of the same rank 1, . . . , n, . . . , N, each dual subtrunk unit being provided with two corresponding subtrunk fault isolators STFI and commendable bridging means between both subtrunks, and each single local load being provided with a local load fault isolator LLFI, so that, in case of fault occurrence in the network, a faulty subtrunk An, Bn respectively ($1 \leq n \leq N$) can be isolated and bypassed thanks to the STFIs and replaced by the sound subtrunk Bn, An respectively, for powering remaining sections of the network;

in case of bypassing of a faulty subtrunk, a control is provided to assure that the sound subtrunk is carrying at most 70% of the maximum rated strand cable current and/or to dynamically assure reduced loading of lower priority loads.

In the invention, the concept of modular rack-mounted power packs, combined with decentralized converters and specifically sized for average loads, is allowing bidirectional conversion, peak shaving, and microgrid utilization.

Further, the present invention is not limited to microgrids associated with HVDC sources. The skilled person will understand that the invention could be easily extended, mutatis mutandis, to microgrids based on one or more high voltage alternating current (HVAC) sources, associated to AC/AC converters as the case may be, leading to the use of a main AC distribution network and loads system.

The combination of renewable power sources and multiple grid connections enable cost savings while increasing the resilience of the overall infrastructure. This concept is advantageously based on the "Power Fusion" technology that operates like a decentralized bidirectional double conversion UPS. The invention is featured with safety means and enhanced with fault detection devices used as isolators to optimize the operability of the infrastructure.

The present invention is related to a new power distribution and backup technology targeting for example 4G and 5G telecom environments and/or equivalent infrastructures, and potentially combining a mix of patented ECITM UPS technology, also known as TSITM, and patented Power Fusion technology, also known as "Virtualization of Power for Data Centers, Telecom Environments and equivalent Infrastructures", as well as insulation means for safety and operational purpose.

It is a first objective of the present invention to provide a HVDC microgrid/bus to bidirectionally provide energy from a central energy reservoir (central backup) to a series of loads, each containing a small energy buffer, which allows to absorb energy consumption peaks and to increase the available power on the microgrid. The bidirectionality of the microgrid elements/hubs have a positive impact on the stability of the grid and the existence of energy backup downstream offers the possibility to redirect power upstream in order to relieve the DC or AC power grid.

Secondly, as the DC bus is intended to convey not only power but also data (e.g. by using a hybrid power cable/ optical fiber such as disclosed in US 2016/0300643 A1), relying on a central safety element induces the risk to lose all the data in case of a fault downstream in the bus. According to the invention, a fault isolation strategy will be adopted, using the fault segregation principle (or distinct breaker levels).

The advantages of fault segregation permit to avoid general installation shutdown as well as local loads shutdown and to allow safe maintenance intervention for the operators with life loads. Other improvements of distributed power availability may be implemented thanks to adequate distribution topology.

Thirdly, in addition to main energy supply, the application of "Power fusion" principles provides energy buffer sharing between bidirectional DC input stages of converters (DC connected to DC bus in local), to avoid voltage drop on long wires, while leading to higher resilience of distributed power.

Figure 2:
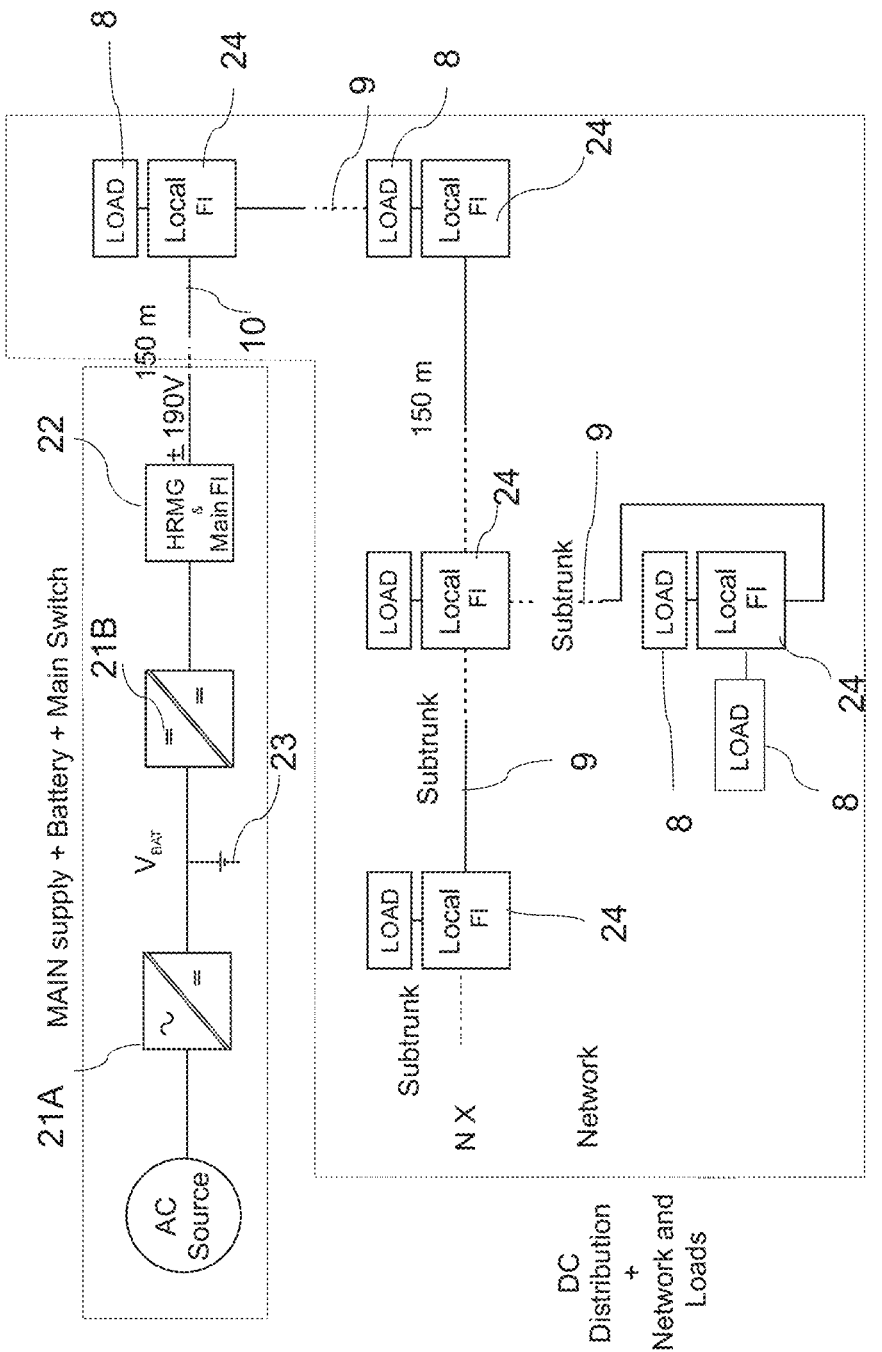
FIG. 2 is a schematic circuit diagram of a DC distribution microgrid power supply according to a second embodiment of the invention, which is a variant of the embodiment of FIG. 1, including a centralized battery backup.
Figure 3:
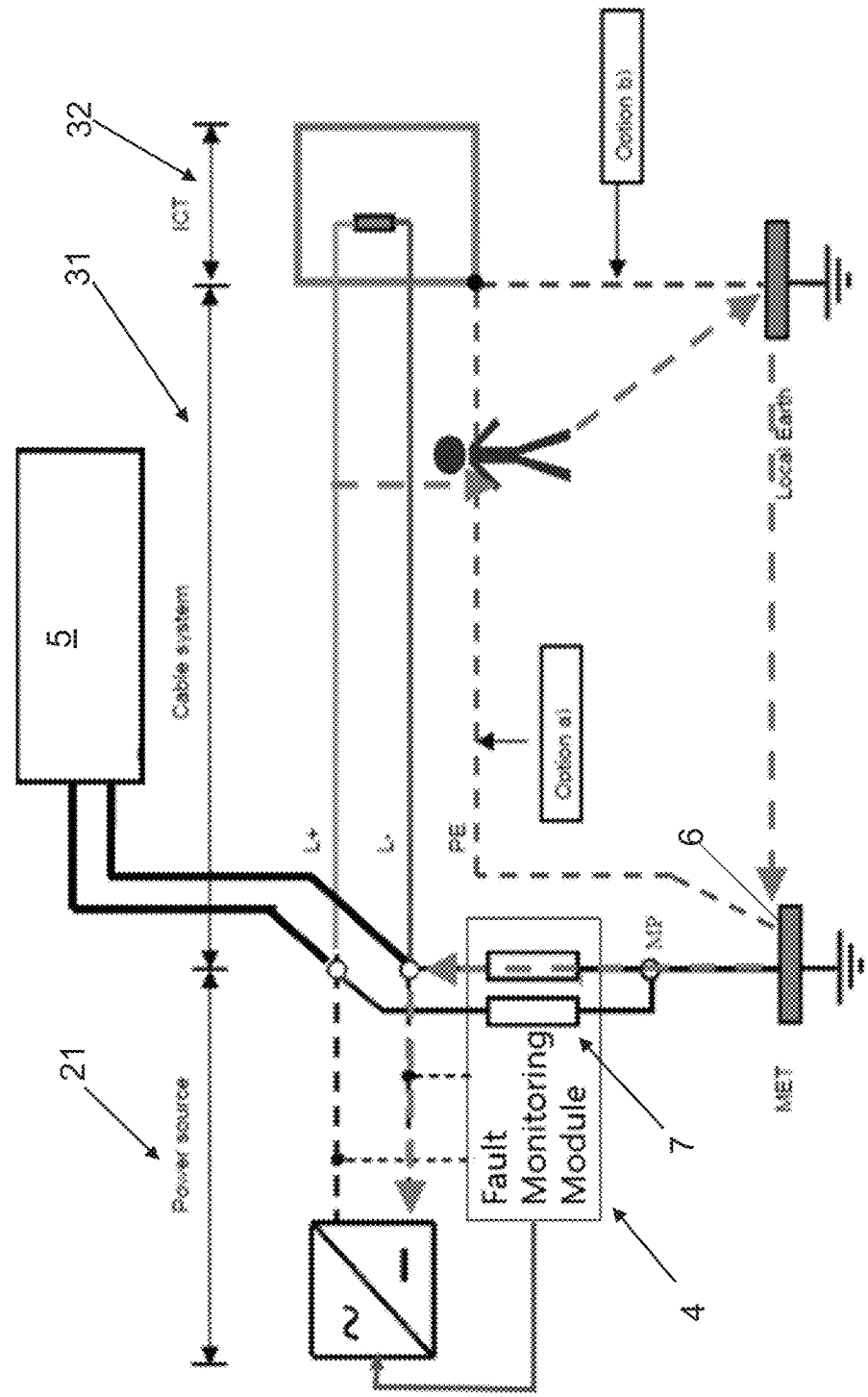
FIG. 3 is a schematic circuit diagram of an earth connection for a bipolar output voltage source called high resistance mid-point grounding (HRMG) used in the above-mentioned HVDC distribution microgrid power supply.

According to some embodiments of the invention shown on FIG. 1 to FIG. 3, an AC source 1 (grid) is connected to a first functional block 2, comprising the main supply 21, the main fault isolator or main FI 22 and optionally a battery 23. The first functional block 2 is connected to a second functional block 3 comprising the DC distribution lines (cable system) 31 and the (IT) loads 32.

The AC/DC converter 21 connects the AC grid 1 and the distributed 380 Vdc (+/−190 Vdc) DC voltage. The main supply is connected to the DC distribution network and loads 3 through a HRMG (high resistance mid-point ground) fault monitoring module 4 and a series 100 ms opening time main breaker 5. In the fault monitoring module 4, each DC line is connected to the common ground 6 through two large-value resistors (R) 7 having the same value, making the fault monitoring module. The value of resistor R is in the range 10 kΩ to 1000 kΩ. The current threshold is in the range 4 to 25 mA so as to stay in the zone DCII of standard IEC/TR 60479-5. The HRMG fault monitoring module 4 together with the main breaker 5 and microcontroller 11A (µCcom) form the main FI 22.

In case one of the DC polarities is faulty connected to ground (see FIG. 3), the current flowing in the circuit is forced through the high-ohmic resistors and thus limited to mA values, which is a safety feature suitable for the persons. This feature being built within the controlled fault detection module further allows a quick identification of the fault and owing to safe current levels involved, the system is allowed to continue its operation in a time range before cancelling of the ground fault.

In one embodiment, local loads 8 possibly fed with a DC/DC or a DC/AC converter in series (see FIG. 4, 380V to 48V DC/DC converter) are connected in parallel on the DC distribution lines through a 2 ms opening time current-controlled bipolar relay/switch 51, which is actually a first fault isolator (FI) switch that switches off when leakage current is higher than a predetermined threshold. Cable systems 31 between local loads 8 with their fault isolator 51 and/or subtrunks 9 are provided with a 10 ms to 100 ms opening time second FI switch, which is a current-controlled bipolar relay/switch 52. All the first and second fault isolators 51, 52 are controlled by individual microcontrollers 11B (μCcom), preferably interconnected to address selective segregation of subtrunk fault isolators. Note that, in the following, the terms "subtrunk" and "subtrunk bus" will be used indifferently.

The switch system comprising a length of DC distribution cable with a series bipolar relay/switch 52 and a parallel local load 8 and/or subtrunk 9 with a parallel bipolar relay/switch 51 is called "local fault isolator FI" (Local FI 1, . . . , local FI N). Note that, in FIG. 6 and following, for sake of simplicity, the local FI are also called "local switches" (LS) and the first and second FI switches 51, 52 are also called generically "controlled switches" (CS).

In an embodiment, the rules of safety are the following:

Select R to have Isafe=V+/R, preferably to be in zone DC-II of standard IEC/TR 60479-5:2007 (Effects of current on human beings and livestock—Part 5: Touch voltage threshold values for physiological effects).

Set up a cable structure, as a linear, looped, tree structure or a combination thereof, with unique address for each local switch with its local load.

Set up a current trigger threshold according to above-mentioned standard (380V→+/−190V with HRMG).

Set increasing opening time for fault isolators from local load (with shorter opening time, i.e. less than 2 ms) to the main switches (with longer opening time, i.e. equal or greater than 100 ms). All fault isolators with their subtrunk, from end of trunk (at last subtrunk) to beginning of trunk at main supply, have an increasing opening time (i.e. 10 ms for first end-of-line fault isolator, 20 ms for the second one, . . . , equal to or greater than 100 ms for the main fault isolator connected to first subtrunk; note that in case of tree or looped cable structure, several subtrunks can be connected after the main fault isolator.

Local loads can be fed by bidirectional converters that contain an energy buffer which permits to advantageously implement the "power fusion" approach (see "power fusion" patent application WO 2018/210917 A1).

Energy sources are dynamically and hierarchically distributed.

In case a battery 23 is present, DC/DC converter 21B serves to stabilize the 380 Vdc distributed secondary voltage and to limit DC current in subtrunks. Nominal Vbatt primary voltage can be 48 Vnom or 288 Vnom or 336 Vnom, etc. according to physical constraints in the main power supply system that are the main supply, the battery and the isolating switch.

If the nominal battery voltage is 336V (for 380V float voltage), the 380V-stabilizing DC/DC converter could be possibly avoided but in discharge mode, voltage goes down, and current increases as well as inline drops, leading to less available power before shutdown at end of line.

Loads can be, either directly connected to +/−190V if this is compliant with the HRMG control, or connected through a DC/DC or DC/AC converter after the local switch. For example, the above converter can be DC/DC+/−190 Vdc/48 Vdc if the load is a telecom antenna or can be an inverter DC/AC+/−190 Vdc/230 Vac@50 Hz or +/−190 Vdc/120 Vac@60 Hz if the load is a common grid AC power supply.

According to one embodiment of the invention, in a linear distribution grid with only one centralized +/−190 Vdc main source, the local switches have two outputs, and a unique address (Load and subtrunk), and behave as follows:

each local load is disconnected if the leakage current to earth, after the upstream double switch fault isolator 51, 52, is higher than a threshold value comprised between 2 and 25 mA (to be set at system installation) in less than T3, with T3 less than 10 ms, typically between 1 and 2 ms;

the opening time T2 of the last subtrunk with highest address, penultimate, antepenultimate, etc. are respectively T2=10 ms, 10+x ms, 10+2x ms, 10+Nx ms, etc. (x integer, N=total number of double switches DS), with the highest value of T2 always staying below T1, with T1 being higher or equal than 100 ms, in such a way that all the upstream "good" subtrunks remain supplied while the "first" subtrunk having a leak to earth is isolated thanks to its related subtrunk switch;

the main fault isolator switch has an opening time greater or equal than T1=100 ms for a leakage current defined in a safety standard (i.e. for IEC 60479, the current is comprised between 4 and 25 mA).

The powering network according to the invention can be:

linear with one or two DC sources, in the latter case one at each end of the network, as a redundant equipment, and with gradual (increasing) addressing of the local switches as from the (or one) source. Note that the linear cabling topology with 2 power supplies, one at each end, has to implement that increasing switching time twice: once increasingly proportional to address sequence value, i.e. from first source to last subtrunk, and once decreasingly proportional to address sequence value, i.e. from second source to first subtrunk. This double supply approach is able to isolate the faulty subtrunk without losing local load (See example in FIG. 4);

in a loop with one DC source: the addressing of double switches in a loop is handled like the configuration of double power sources based on a linear structure;

in a tree structure with a single DC source: the tree cabling topology shall be processed with a linear addressing approach to give a unique address per double switch DS, each switch having a 2 states-flag: Load or No-Load and SubTrunk or No-SubTrunk. These two flags lead to 3 combinations for the 2 switches on board: L&L (2 Loads) or L&ST (1 Load & 1 SubTrunk), ST&ST (2 SubTrunks). Each branch of the tree will always end with a subtrunk terminated by a load. With one double flag per switch, the double switch controller can isolate the faulty load or the last faulty subtrunk (See switching table in FIG. 5). For example the switching table can be implemented using DIP switches, which are preset at the installation of the microgrid.

This strategy of possibly isolating a single subtrunk at once leads to higher resilience on DC distribution not only at high level of human safety but also to the possibility of safe live maintenance, without stopping the loads (i.e. radio antennas in 5G network).

5G technology in particular requires powering of hundreds of small antennas in cities, malls, car parks, buildings, etc. Different powering solutions are available: directly from the grid, using an existing infrastructure or providing innovative "microgrid" technology (see above).

Figure 4:
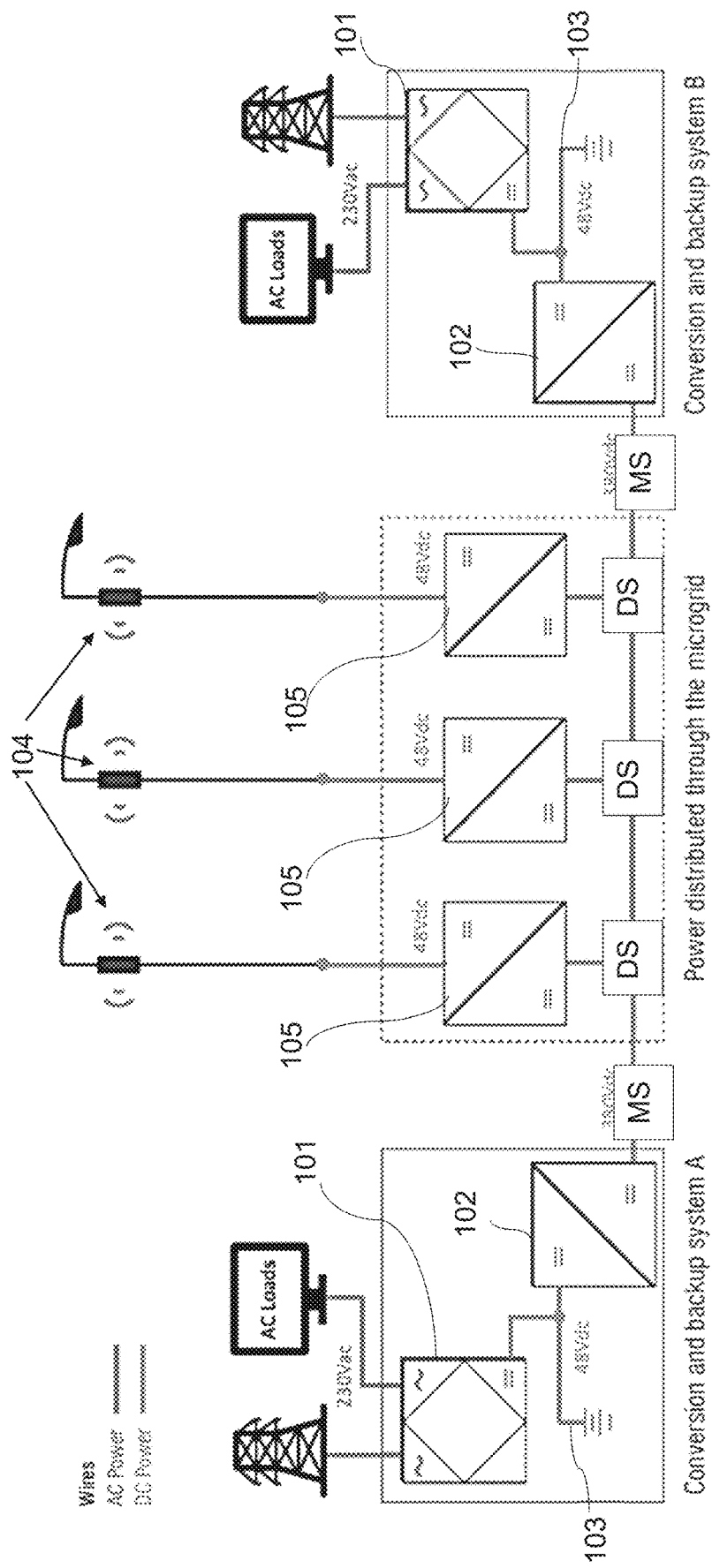
FIG. 4 schematically shows an example of microgrid solution based on DC distribution for efficiently and safely powering a 5G antenna network having critical AC loads too.

FIG. 4 shows an example of microgrid solution based on DC distribution, for efficiently powering a 5G antenna network while allowing to secure antennas. A system with two power sources is represented. Each backup and conversion system A and B comprises a first converter AC/DC/AC 101 which can be connected in input to the AC grid and in output to 230 Vac loads and to a DC/DC converter 102 which output provides 380 Vdc for distributing DC power through a microgrid according to the invention. A battery 103 (e.g. 48 Vdc) can also be connected to the conversion system as described above. In the case illustrated on FIG. 4, 5G antennas 104 located on street lamp posts are powered by SELV voltage, e.g. 48 Vdc, necessitating for each one a DC/DC converter 105 (380 Vdc/48 Vdc). In FIG. 4, according to another embodiment, the AC loads can each be replaced by a second AC source, such a diesel genset, in order to improve the supply availability (not shown).

Examples of Wiring Topologies

Linear Microgrid (µGrid) with One Power Supply

Figure 6:
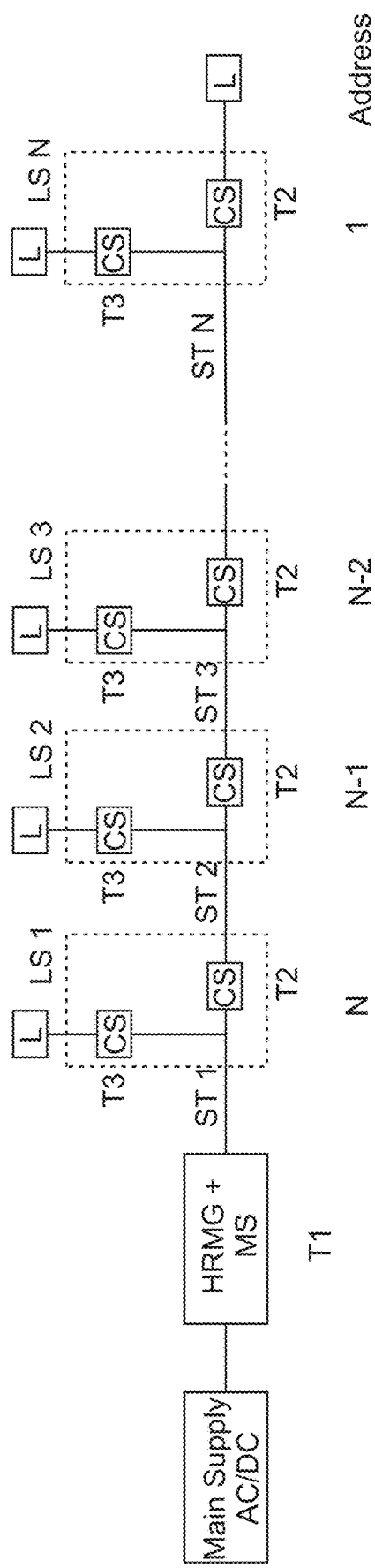
FIG. 6 schematically represents a linear microgrid energy distribution with a single power supply, according to one embodiment of the invention.

As shown on FIG. 6, the structure is the following: Main Supply AC/DC+HRMG/Main Switch (MS)+SubTrunk 1 (ST1) with 2 Controlled Switches (CS) making a Local Switch 1 (LS1) and one Local Load (L)+ . . . +STN with 2 CS (LSN) and 2 L. The local switches LS1, LS2, LS3, . . . , LSN have respective addresses N, N−1, N−2, . . . , 1.

The µGrid partially resists to a total line disconnection, the upstream part from the point of disconnection being still powered. Resilience is weak. The addressing of the LS is linear and allows to eliminate the faulty ST as well as those which are located downstream. The (increasing) timing structure of the breakers is such that the ST are disconnected one by one from the faulty spot (or subtrunk) upstream to the power supply, by process of elimination. The cost of the system is low.

Linear µGrid with Two Power Supplies Located at Both Ends OT the Grid

Figure 7:
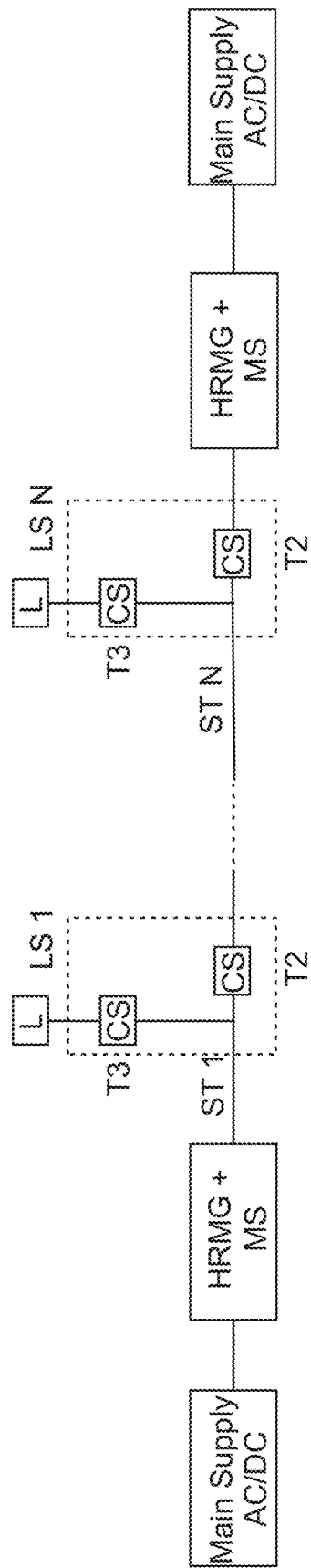
FIG. 7 schematically represents a linear microgrid energy distribution with two power supplies, respectively located at a first end and a second end of the grid, according to another embodiment of the invention.

As shown on FIG. 7, the structure is the following: Main Supply AC/DC #1+HRMG/MS #1+SubTrunk 1(ST1) with 2 Controlled Switches (CS) making LS1 and one Local Load (L)+ . . . +STN with 2 CS making LSN and 1L+HRMG/MS #2+Main Supply AC/DC #2.

The µGrid resists to a total line disconnection, the upstream and downstream parts from the point of disconnection being still powered. Resilience is strong, as the system continues to be operated while losing only one ST thanks to the two independent power supplies and HRMG/MS.

The cost thereof is high owing a second AC source needed in another location, except if this second AC source is already the source of another neighbouring DC µGrid (likely case in a city).

µGrid in Tree with One Power Supply

Figure 8:
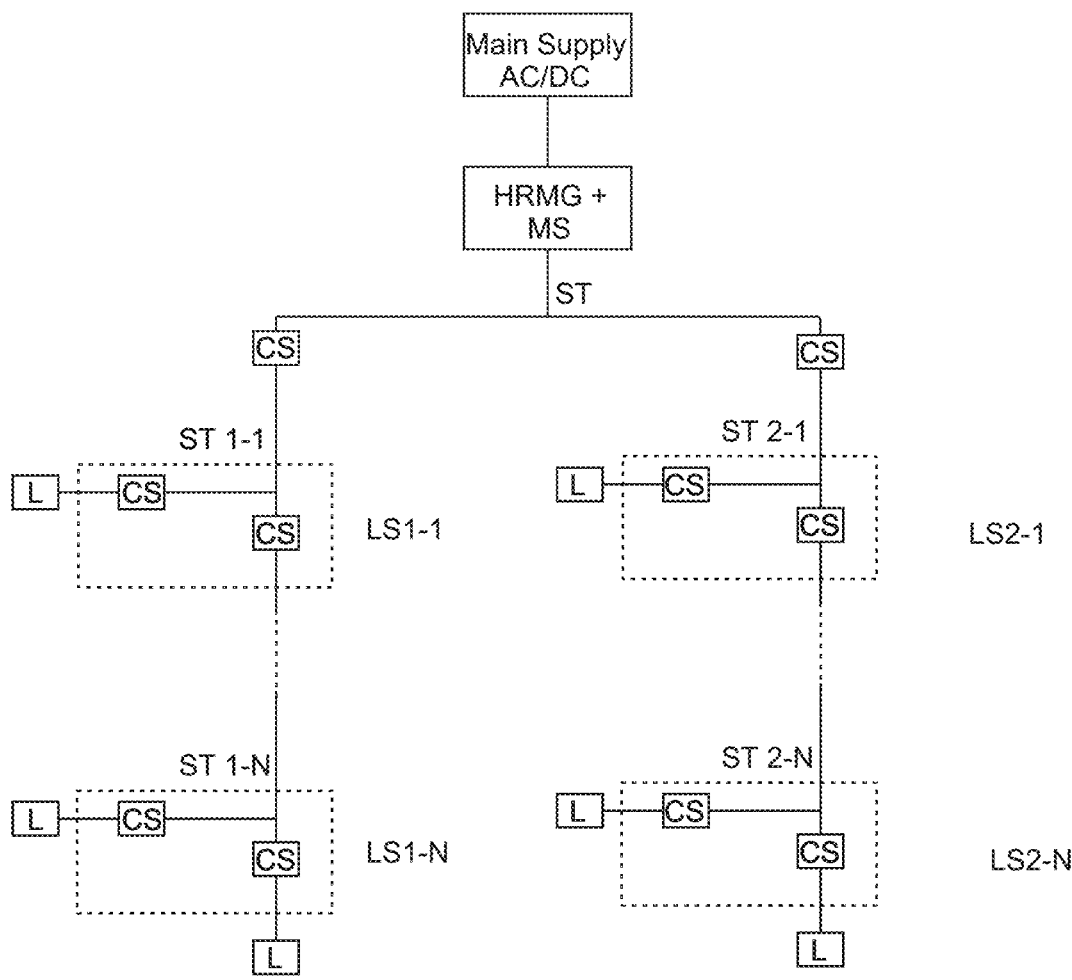
FIG. 8 schematically represents a microgrid in an energy distribution tree configuration, according to another embodiment of the invention.

As shown on FIG. 8, the structure is the following: Main Supply AC/DC+HRMG/MS+Subtrunk (ST)+2 Controlled Switches (CS)+2 branches:

ST1_1 with 2 Controlled Switches (CS) making a Local Switch 1 (LS1_1) and one Local Load (L)+ . . . +ST1_N with 2 CS (LS1_N) and 2 L;

ST2_1 with 2 Controlled Switches (CS) making a Local Switch 1 (LS2_1) and one Local Load (L)+ . . . +ST2_N with 2 CS (LS2_N) and 2 L.

The resilience is medium as the likelihood of line disconnection decreases with the proximity with the main supply while it increases with the proximity of the loads ("leaf" of tree). The cost thereof is low.

µGrid in Loop with One Power Supply

Figure 9:
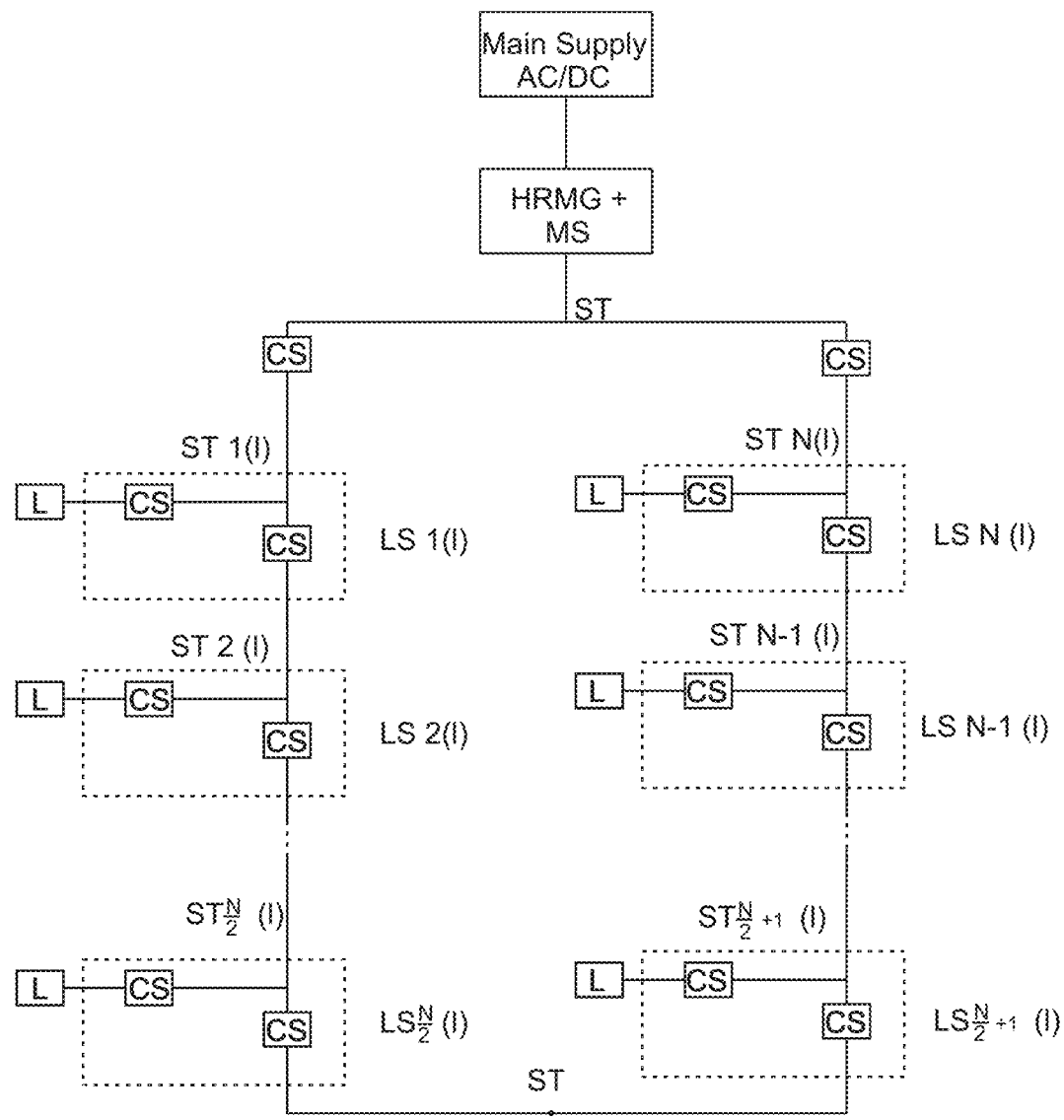
FIG. 9 schematically represents a microgrid in loop configuration, according to still another embodiment of the invention.

As shown on FIG. 9, the structure is the following (with N even): Main Supply AC/DC+HRMG/MS+ST with 2 CS+ST1(1) with LS1(1) and one L+ST2(1) with LS2(1) and one L+ . . . +ST(N/2)(1) with LS(N/2)(1) and one L+ST+ ST(N/2+1)(1) with LS(N/2+1)(1) and one L+ . . . +STN(1) with LSN(1) and one L (return to power supply).

Figure 10:
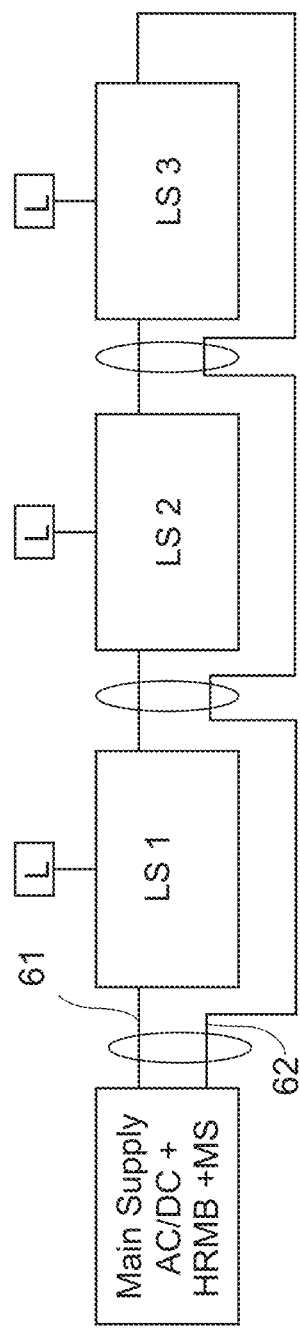
FIG. 10 schematically represents a microgrid in linear loop with one power supply and closed thanks to a second power sub-cable, according to still another embodiment of the invention.

The µGrid resists to total line disconnection. Resilience is strong, as the system continues to operate while losing only one ST but an additional cable section between the last switch and the power supply is needed. The cost thereof is high owing to the need of additional (e.g. buried) cable.

µGrid in "Linear Loop" Closed by a Second Power Sub-Cable with Only One Power Supply As shown on FIG. 10, the structure is similar to that of a loop with one power supply (see FIG. 9). However, in this case the different subtrunks and local switches are powered using cables having a first power sub-cable 61 and a second power sub-cable 62. In this configuration, the first power sub-cable 61 powers all the subtrunks ST1, ST2, ST3, etc. and all the local switches LS1, LS2, LS3, etc. (and all the local loads). The second power sub-cable 62 only closes the electrical circuit between the last subtrunk (LS3 on FIG. 10) and the power supply.

Figure 11:
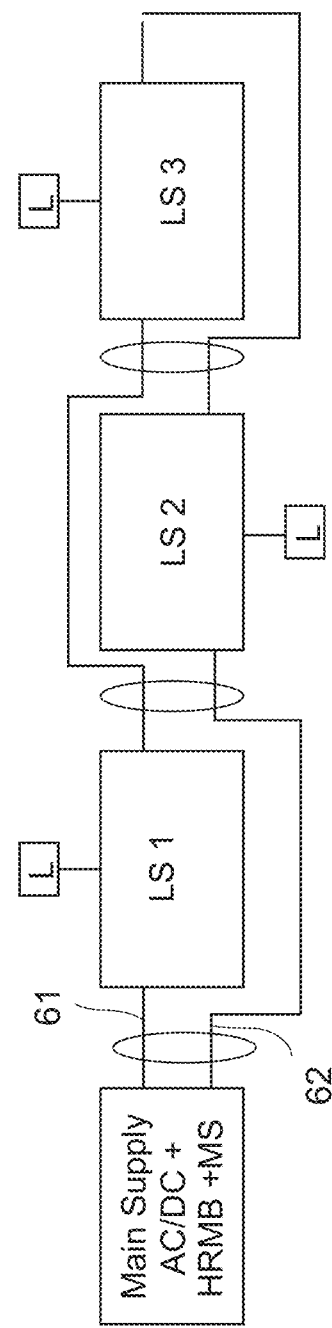
FIG. 11 schematically represents a microgrid in linear loop with one power supply and closed thanks to a second power sub-cable, with the two power sub-cables alternately powering the local loads, according to still another embodiment of the invention.

Resilience is high as the system continues to operate while losing one subtrunk. The cost thereof is low.

µGrid in "Linear Loop" Closed by a Second Power Sub-Cable and Local Loads Powered Alternately with the Two Power Sub-Cables, with Only One Power Supply The structure is shown on FIG. 11. The difference with FIG. 10 is that each power sub-cable alternately powers the subtrunks (or local switches or local loads).

Figure 12A:
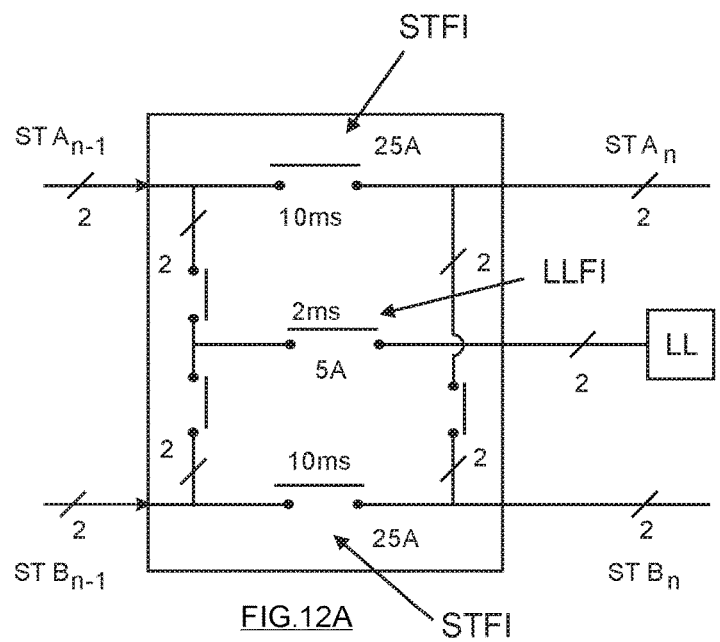
FIG. 12 schematically represents an embodiment of microgrid implementing FIs for a double power feeder group (A&B) both available in a stranded cable, with a minimum of 2×2 power wires, so that the FIs are able to isolate a faulty subtrunk without undue deenergizing of one or more local loads.
Figure 12B:
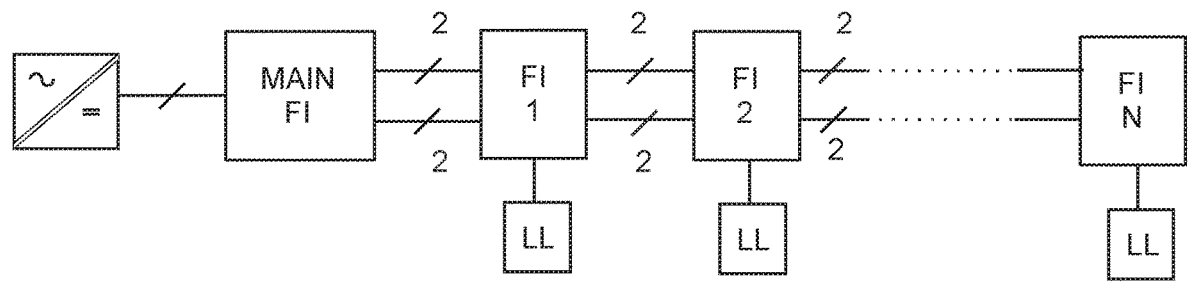

Resilience is high and independent of faulty subtrunk localization and the system continues to operates while losing one subtrunk. The cost thereof is low.

µGrid with Dual Subtrunk FIs (or Dual Power Channel FIs) and Single Local Load FI In the embodiment of FIG. 12, the microgrid is provided with dual subtrunks/power channels FIs and single local loads FIs. FIG. 12A shows an example of detailed topology for differentiated dual subtrunk and local loads FIs, while FIG. 12B more generally shows the principle thereof.

This configuration has the advantage, while using a cable containing 2N power stranded wires, to divide them into two and to subdivide the distribution into two A & B subnetworks of AN & BN subtrunks, the loads being connected on each Ax and/or Bx subtrunk.

A faulty subtrunk Ax, subtrunk Bx respectively, can be isolated by two dual channel FIs (STFIs) and replaced by subtrunk Bx, subtrunk Ax respectively. In this case subtrunk Bx, subtrunk Ax resp., is carrying the sum of the currents normally arriving to Ax and Bx. Losses in the cable being in $RI^2$, according to one embodiment, the load current in the A & B subnetworks will be advantageously limited for example to 70% of Imax in the whole cable and/or lower priority loads will be dynamically reduced/disconnected. In the topology exemplified in FIG. 12A, subtrunk FIs (STFIs) are for example 25A/10 ms FIs under the form of 600V MOS switches in parallel with a relay without breaking capacity and isolated contact ≈1 kV and local loads FIs (LLFIs) are for example 2 ms FIs under the form of 600V MOS switches with free-wheel diode and varistor VDR 400V DC.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS

1 AC grid
2 Main HVDC power supply and main switch
3 DC distribution network and loads
e HRMG fault monitoring module
5 Main breaker
6 Common ground (MET)
7 Resistor
8 Local load
e Subtrunk bus
10 Maintrunk bus
11A Main microcontroller
11B Local microcontroller
21 Main power supply AC/DC converter
21A Input AC/DC converter of main power supply
21B Output DC/DC converter of main power supply
22 Main fault isolator or main FI
23 Battery of main power supply
24 Local fault isolator or local FI
31 Cable system
32 Loads
51 Local load or subtrunk parallel FI switch (first switch)
52 Local load or subtrunk series FI switch (second switch)
61 First sub-cable
62 Second sub-cable
101 AC/DC/AC converter of conversion and backup system
e DC/DC converter of conversion and backup system
103 Battery of conversion and backup system
104 Antenna on street lamp post
105 Local DC/DC converter
CS Controlled switch
DS Double switch
FI Fault isolator
HVDC High voltage direct current
HRMG High resistance mid-point ground
L (or LL) Local load
LLFI Local load fault isolator
LS Local switch
MS Main switch
MET Main earthing terminal
ST Subtrunk
STFI Subtrunk fault isolator
T1, T2, T3 Opening time(s)

The invention claimed is:

1. A microgrid with a high voltage direct current (HVDC) source for efficiently and safely distributing power to decentralized loads, comprising:
at least a main HVDC power supply connectable in input to an AC grid and in output to a main DC distribution network and loads system in output, the main HVDC power supply comprising energy reserve means and a main switch-based fault isolator or main FI, the main DC distribution network and loads system comprising:
a maintrunk bus, and subtrunks buses and/or front end local loads cells connected in parallel to the maintrunk bus, and
at each branching of a subtrunk bus and a load or of a subtrunk bus of rank n−1 and a subtrunk bus of rank n, a local switch-based fault isolator or local FI, n being an integer comprised in the range [1, N]; and
a smart main controller comprising microcontrollers configured to smartly operate in cascade neighboring local FIs in case of fault occurrence in the microgrid so as to segregate the fault and favor or increase a resilience of the microgrid,
wherein smart operation in cascade of the neighboring local FIs comprises assignation of increasing switch opening times to local FIs in the main DC distribution network and loads system, the opening times at respective local FIs having a common time origin set as a fault occurrence time and increasing with increasing electrical or cable length distance of the local FIs, departing from a faulty subtrunk bus location in a direction towards main FI location so as to successively disconnect in a direction towards a main FI location the faulty subtrunk bus or buses from the network until arriving at a first non-faulty subtrunk bus, while at least one possible faulty local load has already been isolated within a timing corresponding to a local FI opening time of a last disconnected faulty subtrunk bus.

2. The microgrid of claim 1, wherein the smart main controller is configured to identify an occurrence of a safety fault, of a type current leakage to earth, and a local power demand peak in local loads in at least one part of the distribution network and loads system and to locally isolate the fault, as well as to command the main central power supply to share at least part of its energy reserve with the local loads in at least one part of the distribution network and loads system, through the maintrunk bus and subtrunk buses, while keeping a voltage stable in whole distribution network and loads system.

3. The microgrid of claim 1, wherein the maintrunk bus comprises subtrunk buses in line and separated by local FIs.

4. The microgrid of claim 1, further comprising:
local bidirectional DC/DC or DC/AC converters configured to convert HVDC voltage to a stable DC, respectively AC, voltage output for powering front end local loads.

5. The microgrid of claim 4, wherein the local bidirectional DC/DC or DC/AC converters for converting HVDC to respective DC or AC voltage output for powering front end local loads are also provided with local energy buffers comprising capacitive buffers so as to allow local energy storage for absorbing power consumption peaks and so as to reduce bus voltage variation.

6. The microgrid of claim 1, wherein the main HVDC power supply comprises a bidirectional AC/DC converter or a bidirectional UPS converter of a type AC/DC/DC provided with an energy storage or a fully bidirectional AC/AC/DC with energy storage.

7. The microgrid of claim 6, wherein the energy storage comprises ECI technology.

8. The microgrid of claim 1, wherein the main FI comprises a high resistance mid-point ground (HRMG) controller and a main switch having an opening time T1 in series with the maintrunk and commanded by a main microcontroller.

9. The microgrid of claim 8, wherein opening time T1 is equal to or higher than 100 ms.

10. The microgrid of claim 1, wherein the local FI comprises a first FI switch located between the maintrunk and the subtrunk/local load, a second FI switch located in series with the maintrunk, or located between a first subtrunk and a secondary subtrunk/local load, and a second FI switch being located in series with the first subtrunk.

11. The microgrid of claim 10, wherein an opening time T3 of all the first FI switches is less than 10 ms, and an opening time T2 of all the second FI switches is such as T2>T3, each pair of first and second FI switches being commanded by a local microcontroller so as to meet the condition T1>(T2+nT1/N)>T3, where n, integer, is a switch address varying between 0 and N−1, with N being a total number of local FIs comprising a first FI switch and a second FI switch.

12. The microgrid of claim 11, wherein opening time T3 is less than 2 ms, and wherein the opening time T2 is at least 10 ms.

13. The microgrid of claim 1, wherein the DC distribution network and loads system has a linear topology with linearly distributed loads and one or two sources, one source being at each end of the maintrunk bus, or makes a loop with at least one source, or comprises a tree structure with a single source or a tree with several sub-loops.

14. The microgrid of claim 13, wherein, in the tree structure, the local and/or subtrunk FI double switches are identified by the smart main controller through unique digital addresses with a related local load flag and/or subtrunk flag.

15. The microgrid of claim 13, wherein, in the linear topology with one source at each end of the maintrunk bus, the local and/or subtrunk FI double switches are identified by the smart main controller, based on digital addressing carried out from the first source up to the second source such that the FIs are configured to isolate a faulty subtrunk from both sides in the linear topology without undue deenergizing of one or more local loads.

16. The microgrid of claim 15, wherein the unique digital addressing per FI double switch comprises two 2-states preset flags, corresponding to Load or No-Load and SubTrunk or No-SubTrunk, allowing the double switch smart controller to isolate the faulty load or the last faulty subtrunk or only the faulty subtrunk in case of loop topology or double source setup.

17. The microgrid of claim 13, wherein, in the loop topology with one source, the local and/or subtrunk FI double switches are identified by the smart controller, based on digital addressing of all FIs in the loop such that the FIs are configured to isolate the faulty subtrunk from both sides of arrival in the loop topology without undue deenergizing of one or more local loads.

18. The microgrid of claim 1, comprising a power cable containing 2N power stranded wires, allowing the microgrid to subdivide the distribution network and loads system into two subnetworks A, B, made each of A1, ..., An, ..., AN and B1, ..., Bn, ..., BN subtrunks respectively, each single local load being connected to one or both subtrunks of the same rank 1, ..., n, ..., N, each dual subtrunk unit being provided with two corresponding subtrunk fault isolators (STFI) and commandable bridging means between both subtrunks, and each single local load being provided with a local load fault isolator (LLFI), such that, in case of fault occurrence in the network, a faulty subtrunk An, Bn respectively ($1 \leq n \leq N$) is isolatable and bypassable due to the STFIs and replaced by the sound subtrunk Bn, An respectively, for powering remaining sections of the network.

19. The microgrid of claim 18, wherein, in case of bypassing of a faulty subtrunk, a control is provided to assure that the sound subtrunk is carrying at most 70% of the maximum rated strand cable current and/or to dynamically assure reduced loading of lower priority loads.

* * * * *